US009954958B2

(12) United States Patent
Childs et al.

(10) Patent No.: US 9,954,958 B2
(45) Date of Patent: Apr. 24, 2018

(54) SHARED RESOURCE MANAGEMENT

(71) Applicant: Red Hat, Inc., Raleigh, NC (US)

(72) Inventors: Bradley Childs, Austin, TX (US); Paul Morie, Georgetown, SC (US); Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 264 days.

(21) Appl. No.: 15/010,793

(22) Filed: Jan. 29, 2016

(65) Prior Publication Data

US 2017/0223115 A1   Aug. 3, 2017

(51) Int. Cl.
| H04L 29/08 | (2006.01) |
| G06F 17/30 | (2006.01) |
| H04L 12/911 | (2013.01) |
| G06F 9/455 | (2018.01) |
| G06F 9/50 | (2006.01) |
| G06F 3/06 | (2006.01) |

(52) U.S. Cl.
CPC ............. *H04L 67/16* (2013.01); *G06F 3/067* (2013.01); *G06F 9/45558* (2013.01); *G06F 9/50* (2013.01); *G06F 17/30194* (2013.01); *H04L 47/781* (2013.01); *H04L 67/10* (2013.01); *H04L 67/1097* (2013.01)

(58) Field of Classification Search
CPC ... H04L 67/10; H04L 67/1097; H04L 67/141; H04L 63/08; H04L 63/10; H04L 47/781; G06F 9/45558; G06F 9/45533; G06F 9/50; G06F 3/067
USPC .................................................. 709/223, 226
See application file for complete search history.

(56) References Cited

U.S. PATENT DOCUMENTS

| 6,178,529 B1 * | 1/2001 | Short ................. G06F 11/2038 709/223 |
| 6,260,068 B1 | 7/2001 | Zalewski et al. |
| 6,338,112 B1 * | 1/2002 | Wipfel ................. G06F 11/008 709/223 |
| 6,678,828 B1 * | 1/2004 | Pham .................... G06F 3/0622 726/2 |
| 6,889,253 B2 | 5/2005 | Griffin et al. |

(Continued)

OTHER PUBLICATIONS

Ahn et al., "Dynamic Virtual Machine Scheduling in Clouds for Architectural Shared Resources", KAIST; UNIST, retrieved from https://www.usenix.org/system/files/conference/hotcloud12/hotcloud12-final16.pdf (5 pages), submitted Jan. 29, 2016.

(Continued)

*Primary Examiner* — Alina A Boutah
(74) *Attorney, Agent, or Firm* — K&L Gates LLP

(57) ABSTRACT

Various examples are directed to systems and methods for executing a computing job at a computing node of a distributed computing system. A node controller may receive computing job request data from a system controller. The node controller may send job start data to a shared resource provider. The shared resource provider may mount a shared resource for the computing job indicated by the computing job request data. The node controller may send a heartbeat message to the system controller and receive from the system controller an acknowledgement message referencing the heartbeat message. The system controller may send to the shared resource provider, a job stop command. In response to the job stop command, the shared resource provider may dismount the shared resource.

20 Claims, 5 Drawing Sheets

(56) References Cited

U.S. PATENT DOCUMENTS

| | | | |
|---|---|---|---|
| 7,024,671 B2 | 4/2006 | Yamashita | |
| 7,111,297 B1 | 9/2006 | Sankaranarayan et al. | |
| 7,181,574 B1* | 2/2007 | Lele | G06F 11/203 |
| | | | 711/137 |
| 7,363,346 B2* | 4/2008 | Groner | G06F 11/1076 |
| | | | 709/214 |
| 7,996,511 B1* | 8/2011 | Wiese | G06F 9/5072 |
| | | | 709/223 |
| 8,769,530 B2 | 7/2014 | Oshins | |
| 9,164,802 B2 | 10/2015 | Netto | |
| 9,195,528 B1* | 11/2015 | Sarda | G06F 11/00 |
| 2002/0049845 A1* | 4/2002 | Sreenivasan | H04L 69/40 |
| | | | 709/226 |
| 2002/0111996 A1* | 8/2002 | Jones | H04L 63/0428 |
| | | | 709/203 |
| 2005/0102562 A1* | 5/2005 | Shinohara | G06F 11/2028 |
| | | | 714/15 |
| 2005/0204183 A1* | 9/2005 | Saika | G06F 11/2025 |
| | | | 714/4.11 |
| 2007/0294563 A1* | 12/2007 | Bose | G06F 11/2092 |
| | | | 714/5.11 |
| 2009/0271412 A1* | 10/2009 | Lacapra | G06F 17/30206 |
| 2010/0192207 A1* | 7/2010 | Raleigh | G06Q 10/06375 |
| | | | 726/6 |
| 2013/0179947 A1* | 7/2013 | Kline, III | H04L 67/28 |
| | | | 726/4 |
| 2013/0290542 A1* | 10/2013 | Watt | H04L 51/22 |
| | | | 709/226 |
| 2013/0332927 A1 | 12/2013 | Tang et al. | |
| 2014/0095691 A1 | 4/2014 | Ganguli et al. | |
| 2014/0108341 A1* | 4/2014 | Marsden | G06F 17/30581 |
| | | | 707/623 |
| 2014/0359343 A1* | 12/2014 | Fu | G06F 11/2033 |
| | | | 714/4.12 |
| 2014/0373095 A1* | 12/2014 | Yoon | H04L 63/10 |
| | | | 726/3 |
| 2015/0007272 A1* | 1/2015 | Zou | H04L 63/10 |
| | | | 726/4 |
| 2016/0044081 A1* | 2/2016 | Pingenot | H04L 65/4069 |
| | | | 709/219 |
| 2017/0083710 A1* | 3/2017 | Chapman, III | G06F 21/6218 |
| 2017/0337071 A1* | 11/2017 | Scott | G06F 9/455 |

OTHER PUBLICATIONS

AuYoung et al., "Democratic Resolution of Resource Conflicts Between SDN Control Programs", Dec. 2, 2014, HP Labs, Palo Alto; Duke University; Google, Inc., retrieved from http://conferences.sigcomm.org/co-next/2014/CoNEXT_papers/p391.pdf (12 pages).

* cited by examiner

SHARED RESOURCE MANAGEMENT

BACKGROUND

A distributed computing system includes a number of computing nodes that are often executed across multiple computing devices. The computing nodes perform computing tasks that often require manipulating shared resources, such as shared data storage resources. When multiple computing nodes access shared resources, however, it is important to maintain the integrity of the shared resources.

SUMMARY

Various examples are directed to systems and methods for executing a computing job at a computing node of a distributed computing system. A node controller may receive computing job request data from a system controller. The computing job request data may describe a computing job for execution by the computing node. The node controller may send job start data indicating at least one shared resource for the computing job to a shared resource provider. The shared resource provider may mount the shared resource and may receive, from a computing job process, a request to access the shared resource. The node controller may send a heartbeat message to the system controller and receive from the system controller an acknowledgement message referencing the heartbeat message. The node controller may send to the shared resource provider, a job stop command. In response to the job stop command, the shared resource provider may dismount the shared resource.

In some examples, the node controller may receive computing job request data from a cloud controller. The node controller may send job start data to a shared resource container. The job start data may indicate a shared network file system (NFS) external to the computing node to be accessed during performance of the computing job. A computing job process may be executed inside the shared resource provider container. The shared resource provider container may create a private file system that references the shared NFS in a private namespace of the shared resource provider container and provide to the computing job process a name referencing the private file system to the computing job process. The node controller may send a heartbeat message to the cloud controller and receive, from the cloud controller, an acknowledgement message referencing the heartbeat message. The node controller may also receive from the cloud controller a job release instruction referencing the computing job and send to the shared resource provider container a job stop command. In response to the job stop command, the shared resource provider container may delete the private file system.

FIGURES

Various examples are described herein in conjunction with the following figures, wherein.

DESCRIPTION

Figure 1:
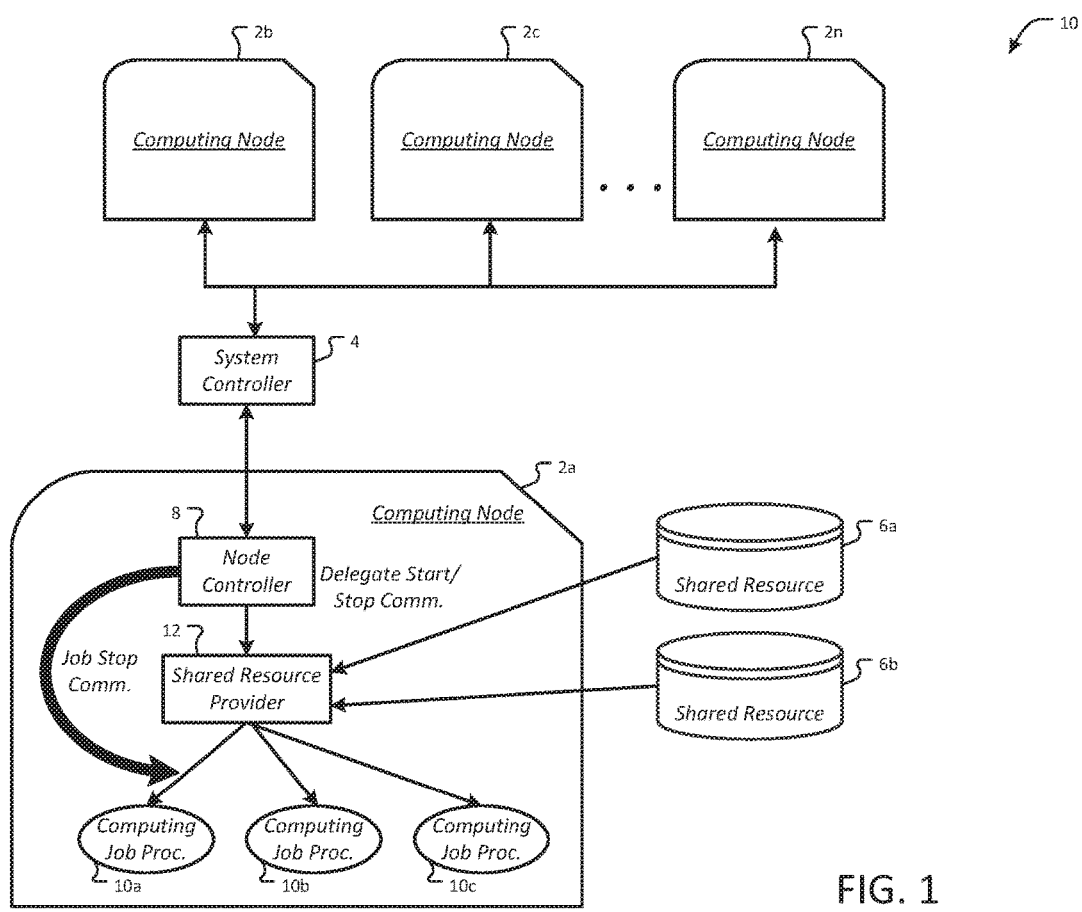
FIG. 1 is a diagram showing one example of an environment for managing shared resources in a distributed computing system.

Various examples are directed to systems and methods for managing shared resources in a distributed computing system. The distributed computing system may include a system controller, a plurality of computing nodes, and shared resources. The system controller may manage the distribution of computing jobs to the computing nodes of the distributed computing system. Shared resources may include any resources in the distributed computing system for which it is desirable to limit access to one computing node at a time. For example, shared resources may include physical and/or logical data storage locations, such as a disk or other drive, a set of memory locations, a file system, a file, a database, a shared file system, etc. The computing nodes may be logical locations in the system where a process can run. In some examples, a computing node may be a physical computing device, such as a server. Also, in some examples, a computing node may be a virtual machine, a container, or other similar construct executing on a server or other computing device.

A computing node may execute a node controller, a shared resource provider, and one or more computing job processes. The node controller may be in communication with the system controller to receive computing job requests. In some examples, the node controller initiates computing job processes to execute requested computing jobs. The shared resources provider may act as a gatekeeper between the computing job processes and the shared resources of the distributed computing system. This may allow the computing node to alternately permit or block the computing job processes from accessing all or a subset of the shared resources. Deterministically permitting or blocking computing job processes from accessing shared resources in this way may allow the computing node to respond to job release commands from the system controller and/or to communication failures.

In some examples, the node controller may also be programmed to exchange periodic heartbeat and acknowledgement messages to the system controller. For example, the node controller may send the system controller heartbeat messages at a determined interval. When the system controller receives a heartbeat message, it may send an acknowledgement message to the node controller. If the system controller fails to receive a heartbeat message from a node controller for more than a threshold time period, it may send a job release command to the node controller and transfer any computing jobs in-progress at the computing node to an alternate computing node. When the node controller receives the job release command, it may instruct the shared resource provider to block computing job processes from accessing shared resources. Also, if the node controller fails to receive an acknowledgement message for more than a threshold time period after sending a heartbeat message, it may also instruct the shared resource provider to block computing processes from accessing the shared resources. In this way, the system controller may move any computing jobs active at the computing node to an alternate computing node while minimizing the risk of corrupting the shared resources.

FIG. 1 is a diagram showing one example of an environment for managing shared resources in a distributed computing system 10. The distributed computing system 10 includes a system controller 4, a number of computing nodes 2a, 2b, 2c, 2n and example shared resources 6a, 6b. The system controller 4 may distribute computing jobs to the various computing nodes 2a, 2b, 2c, 2n and may manage the execution of the computing jobs, for example, as described herein. In some examples, the system controller 4 may be referred to as a cloud controller. The system controller 4 may be executed at a server or other computing device of the distributed computing system 10.

The example shared resources 6a and 6b shown in the environment of FIG. 1 are data storage locations. For example, shared resources 6a, 6b may be physical and/or logical data storage locations, such as a disk or other drive, a set of memory locations, a file system, a file, a database, etc. In some examples, shared resources 6a, 6b may include a shared or network file system (NFS). Also, in some examples, shared resources 6a, 6b, may include block data storage such as, for example, a cloud storage system. In some examples, however, shared resources of the distributed computing system 10 may also include network access, processor access, etc.

Computing nodes 2a may be or include any logical location where a process can run (e.g., a computing job process). For example, one or more of the computing nodes 2a, 2b, 2c, 2n may be or include a physical server or other computing device configured and programmed to execute computing job processes. Also, in some examples, one or more of the computing nodes 2a, 2b, 2c, 2n may be or comprise a virtual machine configured and programmed to execute computing job processes. In some examples, one or more of the computing nodes 2a, 2b, 2c, 2n may be a container executed within a virtual or physical machine and configured to execute computing job processes.

In FIG. 1, additional components and details are shown for the computing node 2a. The other computing nodes 2b, 2c, 2n may have components and details similar to those of computing node 2a or different. Referring to computing node 2a, a node controller 8 is shown. The node controller 8 may receive computing job requests from the system controller 4 and manage the execution of the computing jobs by the shared resource provider 12 and computing job processes 10a, 10b, 10c (described herein below). In some examples, the node controller 8 is executed at the computing node 2a as process, such as a daemon process that runs in the background. Also, in some examples, the node controller 8 is executed as a container.

The shared resource provider 12 may mount shared resources 6a, 6b, etc., and manage access to the shared resources for example computing job processes 10a, 10b, 10c. In some examples, the shared resource provider 12 may be executed at the computing node 2a as a process. For example, the computing job processes 10a, 10b, 10c may be programmed to access shared resources 6a, 6b only through the shared resource provider 12. In some examples, the shared resource provider 12 may be executed as a container at the computing node 2a. Computing job processes 10a, 10b, 10c may be executed in the container (e.g., within the shared resource provider 12). Also, in some examples, the shared resource provider 12 may be a hypervisor with each computing job process 10a, 10b, 10c executed as or in a separate virtual machine. Although the node controller 8 and shared resource provider 12 are shown as distinct, in some examples, a single component (e.g., a single process, a single container, a single virtual machine hypervisor, etc.). may perform the functions of both the node controller and shared resource provider 12.

Computing job processes 10a, 10b, 10c may be any suitable processes or other components for executing all or part of a computing job in the distributed computing system 10. Three example computing job processes 10a, 10b, 10c are shown, but any suitable number of computing job processes may be executed at the distributed computing system 10 at any given time. Also, although computing job processes 10a, 10b, 10c are described, other components may be used to execute computing jobs, such as, for example virtual machines.

Figure 2:
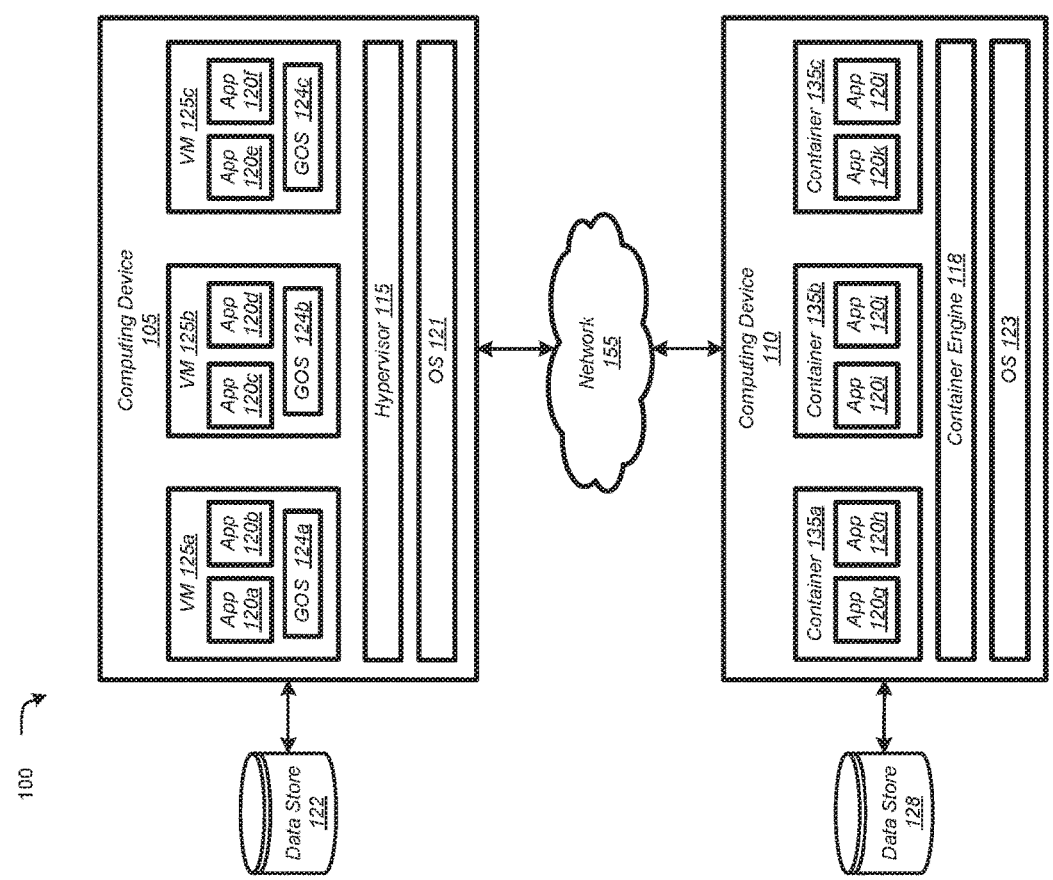
FIG. 2 shows an example hardware environment of the distributed computing system of FIG. 1.

FIG. 2 shows an example hardware environment 100 of the distributed computing system 10 of FIG. 1. The environment 100 may comprise one or more computing devices 105, 110. The computing devices 105, 110 may comprise any suitable type of computing device or machine that has a programmable processor including, for example, one or more servers, one or more desktop computers, one or more laptop computers, one or more routers, etc. In some examples, one or both of the computing devices 105, 110 may comprise a single machine or may include multiple interconnected machines (e.g., multiple servers configured in a cluster). Although two computing devices 105, 110 are shown, any suitable number of computing devices may be utilized in the distributed transactions described herein. The computing devices 105, 110 may be implemented by a common organization or by different organizations. In some examples, the computing devices 105, 110 may be servers maintained as part of a cloud services system, such as, for example, Amazon Web Services available from Amazon.com, Inc. and Public Cloud available from Rackspace, Inc. Although two computing devices 105, 110 are shown, the environment 100 may comprise any suitable number of computing devices 105, 110.

Computing devices 105, 110 may execute respective operating systems (OSs) 121, 123. Any suitable operating system may be used including, for example, any suitable LINUX operating system (e.g., available from Red Hat, Inc.), any suitable Windows operating system available from Microsoft Corporation, any suitable UNIX operating system, any suitable OS operating system available from Apple, Inc., any suitable Android operating system available from Google Inc., any suitable iOS operating system available from Apple, Inc., etc. The operating systems 121, 123 may manage execution of the various other components at the computing devices 105. In some examples, the operating systems 121, 123 may facilitate communication between the components and system hardware, such as data stores 122, 128. In some examples, computing devices 105, 110 comprise and/or are in communication with one or more data stores 122, 128.

Data stores 122, 128 may be organized according to one or more file systems and may be in communication with the operating system 121, 123. In some examples, data stores 122, 128 are organized according to and/or comprise any suitable database, and/or other data storage arrangement. Data stores 122, 128 may be internal to computing devices 105, 110, or external and connected to computing device 105, 110 either directly or via a network, such as the network 155. In some examples, data stores 122 may be or comprise shared resources, such as 6a, 6b described above, that may be manipulated during distributed transactions.

The computing devices 105, 110 may be in communication with one another via a network 155. The network 155 may be any suitable wired and/or wireless network and may comprise, for example, one or more local area networks (LANs), one or more wide area networks (WANs), one or more public networks such as the Internet, etc. The network 155 may carry communications between computing devices 105, 110. In some examples, shared resource management may be performed without using a network, such as network 155. For example, the environment 100 may be implemented on a single computing device 105 or 110. Different components of the distributed computing system 10 may be executed at different containers and/or virtual machines executing on the same computing device 105, 110. Also, for example, the computing devices 105, 110 may be directly connected to one another.

Computing devices 105, 110 illustrate different example architectures for executing shared resource management, as described herein. Computing device 105 executes a software layer or hypervisor 115 and various virtual machines 125a, 125b, 125c. The hypervisor 115 may execute above the hardware of the computing device 105 (e.g., data storage 122, processor or processors, memory or memories, etc.) and below the virtual machines 125a, 125b, 125c. In some examples, the hypervisor 115 may be a component of the OS 121, executed by the computing device 105. In other examples, the hypervisor 115 may be provided by an application running on the OS 121, or may run directly on the computing device 105 without an operating system beneath it (e.g., the OS 121 may be omitted). The hypervisor 115 may virtualize the physical layer, including processors, memory, and I/O devices, and present this virtualization to virtual machines 125a, 125b, 125c as devices, including virtual processors, virtual memory devices, virtual I/O devices, etc.

In some examples, the virtual machines 125a, 125b, 125c may execute respective guest operating systems 124a, 124b, 124c, which may utilize the virtual physical layer provided by the hypervisor 115. The virtual machines 125a, 125b, 125c may execute one or more applications 120a, 120b, 120c, 120d, 120e, 120f under the respective guest OSs 124a, 124b, 124c. In some examples, guest OSs 124a, 124b, 124c may assign applications 120a, 120b, 120c, 120d, 120e, 120f virtual address space from the physical memory (e.g., data store 122) of the computing device 105 indicated by a device register. Applications 120a, 120b, 120c, 120d, 120e, 120f may reference their respective virtual address space with virtual memory addresses provided by the guest OSs 124a, 124b, 124c.

Computing device 110 may execute containers 135a, 135b, 135c. Containers 135a, 135b, 135c may be virtualized objects similar to virtual machines 125a, 125b, 125c except that containers 135a, 135b, 135c may not implement separate guest OSs and may, instead, utilize the OS 123 of the computing device 110. Applications 120g, 120h, 120i, 120j, 120k, 120l may execute in the respective containers 135a, 135b, 135c. The containers 135a, 135b, 135c may each have one or more respective, filesystems, memory, devices, network ports, etc. for accessing the physical resources of the computing device 110 and other resources outside of the computing device. Specific requests to access physical resources of or outside of the computing device 110 may be made through the OS 123. In some examples, a container 135a may utilize one or more namespaces provided by the OS 123 to tie its filesystems memory, devices, network ports, etc., to the physical resources of the computing device 110. In some examples, the computing device 110 may execute a container engine 118 for facilitating interactions between the containers 135a, 135b, 135c and the OS 123. Example container engines 118 include the Docker Engine available from Docker, Inc. and the Rocket Container Engine available from CoreOS.

The various components of the environment 100 may implement some or all of the components for shared resource management described herein. For example, a virtual machine 125a, 125b, 125c and/or container 135a, 135b, 135c may be a system controller 4, computing node 2a, 2b, 2c, node controller 8, and/or shared resource provider 12. Applications 120a-l may be computing job processes 10a, 10b, 10c. Data stores 122, 128 may implement all or part of the shared resources 6a, 6b.

Figure 3:
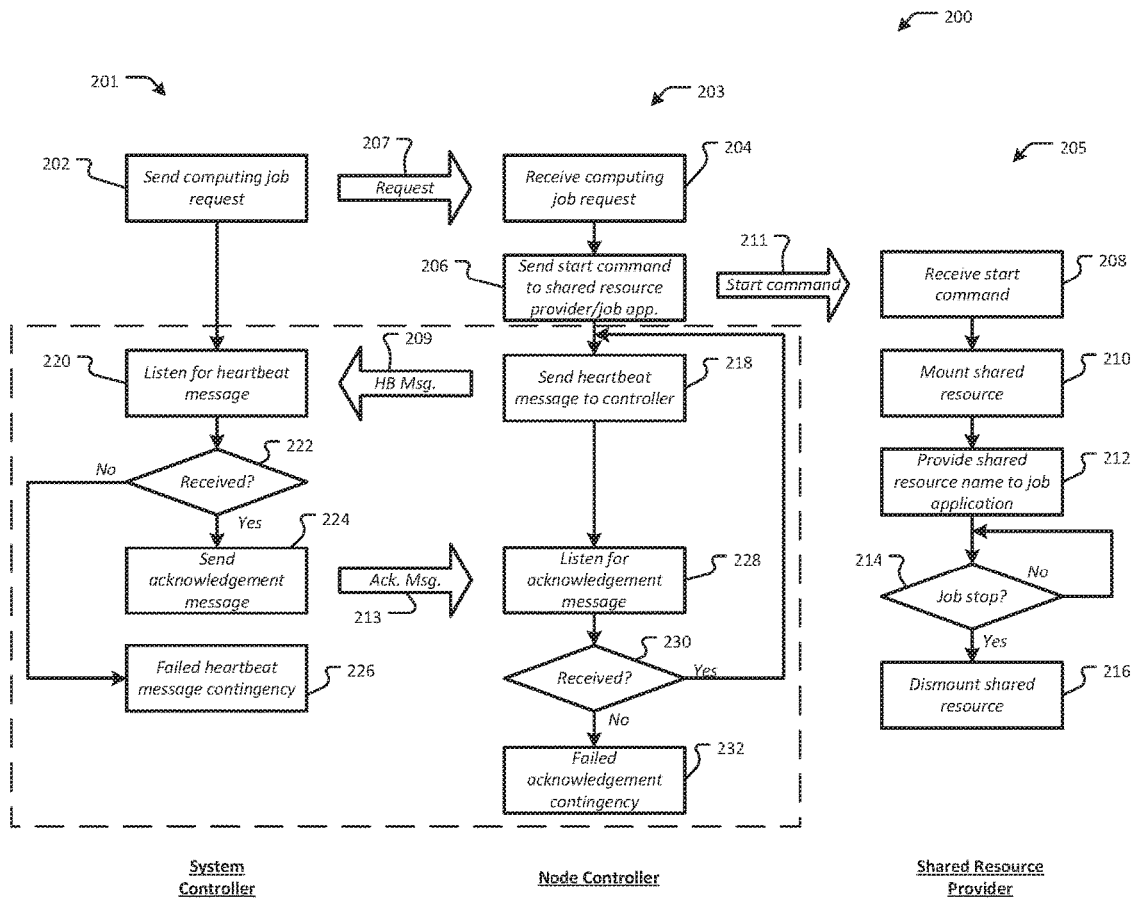
FIG. 3 is a flow chart showing one example of a process flow that may be executed by the distributed computing system to manage shared resources.

FIG. 3 is a flow chart showing one example of a process flow 200 that may be executed by the distributed computing system 10 to manage shared resources. The process flow 200 includes three columns. A column 201 includes actions that may be performed by the system controller 4. Column 203 includes actions that may be performed by the node controller 8, or any other node controller in the distributed computing system. Column 205 includes actions that may be performed by the shared resource provider 12, or any other shared resource provider associated with the node controller.

At 202, the system controller 4 may send to the node controller 8 a request 207 to execute a computing job at the computing node 2a managed by the node controller 8. Computing jobs may be of various different types and in various different contexts. One example computing job may include executing a web server to access file stored at a shared storage. Another example computing job may include a database that accesses database files stored at a shared storage. Yet another example computing job may include a video rendering application that retrieves and merges video files stored on a shared storage. The node controller 8 may receive the computing job request at 204. The request 207 may comprise a description of the requested computing job. The description may include, for example, executing instructions for performing the computing job and/or a pointer or other reference to an executable computing job process for executing the computing job. In some examples, the request 207 may also include parameters to be passed to the computing job process for performing the computing job. The request 207 may identify shared resources that are to be used and/or manipulated for the requested computing job (e.g., the shared resources for the computing job). For example, the request 207 may comprise a name or names identifying the shared resources for the computing job. Also, in some examples, the node controller 8 may be programmed to determine the shared resources for the computing job from the description of the computing job included with the request 207. At 206, the node controller 8 may send a job start command 211 to the shared resource provider 12. The node controller 8 may also directly or indirectly instantiate one or more computing job processes 10a, 10b, 10c for executing the requested computing job. In some examples, however, the shared resource provider may instantiate the computing job process or processes 10a, 10b, 10c.

The shared resource provider 12 may receive the job start command 211 at 208. The job start command 211 may comprise job start data that identifies the shared resource or resources to be accessed during performance of the computing job. For example, when the computing job involves a web server accessing files stored at the shared storage, the job start command 211 may comprise data describing parameters of the web server and data describing the files to be retrieved from the remote storage. The job start data may directly identify the shared resources for the computing job, for example, by including one or more resource names, such as file names, Universal Resource Locators (URLs), etc. In some examples, the job start data may indirectly identify the shared resources for the computing job. For example, the job start data may include a description of the computing job. The shared resource provider 12 may analyze the job start data and derive the shared resources for the computing job from the description of the computing job.

At 210, the shared resource provider 12 may mount the shared resource or resources for the computing job. Mounting the shared resource may comprise initializing a service that allows the computing job process or processes 10a, 10b, 10c to access the resource. This may be done in any suitable manner. In some examples, the shared resource provider 12 may manipulate the shared resources 6a, 6b in response to function calls from the computing job process or processes 10a, 10b, 10c. In some examples, the shared resource provider 12 may create a local file system describing data at the shared resource or resources 6a, 6b. In some examples, the mount may be performed in a private namespace of the shared resource provider. In this way, the mount may not be visible to other components at the computing node 2a, such as computing job processes 10a, 10b, 10c, except through the shared resource provider 12. For example, when the shared resource provider 12 is a container, mounting the shared resource 6a, 6b may comprise creating a private file system in the private namespace of the container. The shared resource provider 12 may link the private file system to a shared resource 6a, 6b. For example, when the linked-to shared resource is a network file system, the private file system may map to the network file system. In some examples, when the linked-to shared resource is a block data storage, the private file system may map to the block data storage and provide file structure to data blocks stored at the share resource.

The private file system may be available to computing job processes 10a, 10b, 10c executing in the container. At 212, the shared resource provider 12 may optionally provide the names of the mounted shared resources 6a, 6b to the appropriate computing job processes 10a, 10b, 10c. For example, when the shared resource provider 12 mounts the shared resources 6a, 6b in it private namespace, the shared resource provider 12 may provide the computing job processes 10a, 10b, 10c with one or more container volume names. A container volume name may be the name of a shared resource 6a, 6b in the private namespace of the shared resource provider 12.

At 214, the shared resource provider 12 may determine whether it has received a job stop command from the node controller 8. A contingency may occur when the node controller 8 sends a job stop command to the shared resource provider 12. The node controller 8 may send a job stop command, for example, when it receives a job release command from the system controller 4 and/or when it loses communication with the system controller 4, as described herein. If the shared resource provider 12 does not receive a job stop command, it may continue to allow the various computing job processes 10a, 10b, 10c to access the shared resources 6a, 6b. If the shared resource provider 12 does receive a job stop command, it may, at 216, dismount the shared resources 6a, 6b. Because the computing job processes 10a, 10b, 10c access the shared resources 6a, 6b primarily or exclusively through the shared resource provider 12, when the shared resource provider 12 dismounts the shared resources 6a, 6b, it may prevent the computing job processes 10a, 10b, 10c from further accessing the shared resources 6a, 6b.

FIG. 3 also illustrates an exchange of heartbeat messages 209 and acknowledgement messages 213 between the node controller 8 and the system controller 4. For example, the node controller 8, while 222it is active, may send periodic heartbeat messages 209 to the system controller 4. This may allow the system controller 4 to confirm that the computing node 2a is active and operating properly. In some examples, the system controller 4 may respond to a heartbeat message 209 by sending to the node controller 8 an acknowledgement message 213. This may allow the node controller 8 to confirm that it is still in communication with the system controller 4 (and therefor able to receive messages and/or instructions from the system controller 4).

In some examples, after receiving the computing job request at 204, the node controller 8 may, at 218 send a heartbeat message 209 to the system controller 4. The heartbeat message 209 may include any suitable data indicating that the computing node 2a is operational. In some examples, the heartbeat message 209 includes data describing the computing node 2a such as, for example, a computing node name, an Internet Protocol (IP) address, etc. In some examples, the heartbeat message 209 may include a timestamp indicating the time at the computing node 2a when the heartbeat message 209 was sent. The node controller 8 is programmed to send heartbeat messages, such as 209, at a heartbeat interval (e.g., every second, every 10 seconds, etc.) In some examples, the system controller 4 may provide the heartbeat interval to the node controller 8. For example, data describing the heartbeat interval may be included in the computing job request 207. For example, the computing job request 207 may include an indication of the heartbeat interval.

In some examples, the system controller 4 may begin listening for heartbeat messages from the node controller 8, at 220, after sending the computing job request 207. The system controller 4 may be programmed to expect heartbeat messages from the node controller 8 at the heartbeat interval. At 222, the system controller 4 may determine whether the heartbeat message 209 has been received when expected. For example, the system controller 4 may expect to receive the heartbeat message 209 within a threshold from the time that the last heartbeat message was received from the node controller 8. The threshold may be determined based on the based on the heartbeat interval. In some examples, the threshold may be equal to the heartbeat interval plus a buffer time. If the heartbeat message 209 has been not been received at 222, then the system controller 4 may execute a failed heartbeat message contingency at 226. If the heartbeat message 209 has been received by 222, then the system controller 4 may send the node controller 8 an acknowledgement message 213 at 224. The acknowledgement message 213 may include data referencing the heartbeat message 209. In some examples, the acknowledgement message 213 may simply be a copy of the heartbeat message 209 with a digital signature of the system controller 4.

After sending the heartbeat message 209, the node controller 8 may, at 228, listen for the acknowledgement message 213. At 230, the node controller 8 may determine whether the acknowledgement message 213 has been received within an acknowledgement threshold time. The acknowledgement threshold time may be any suitable time measured, for example, from the time that the heartbeat message 209 was sent. In some examples, the system controller 4 may provide the node controller 8 with the acknowledgement threshold time. For example, data describing the acknowledgement threshold time may be included in the computing job request 207. If the acknowledgement message 213 is received, the node controller may return to 218 and send a new heartbeat message (e.g., at the next time prescribed by the heartbeat interval). If the acknowledgement message 213 is not received, then the node controller 8 may execute a failed acknowledgement contingency at 232.

Figure 4:
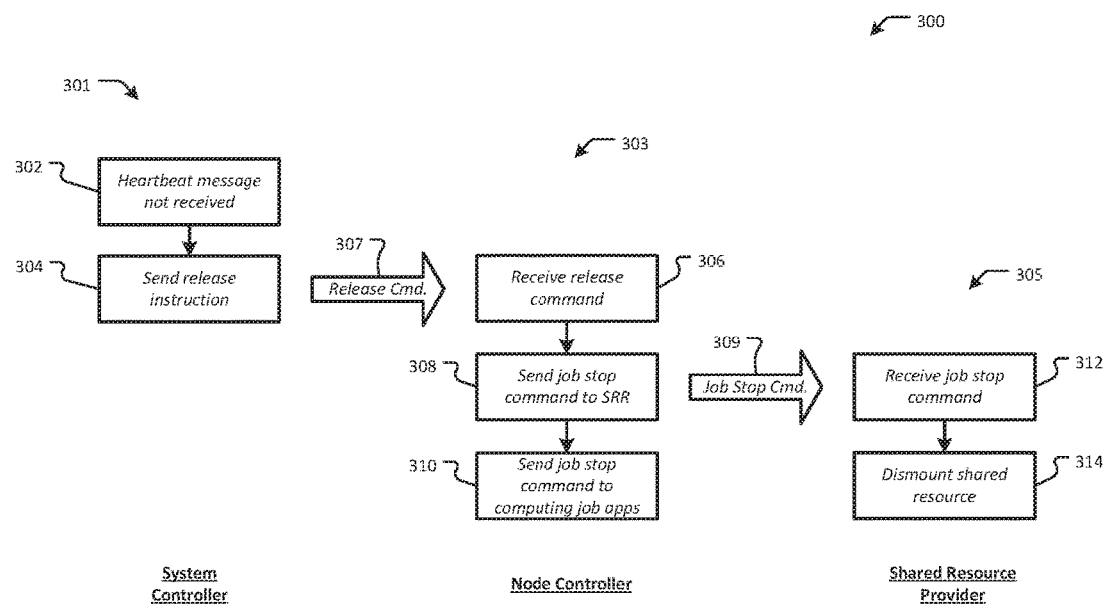
FIG. 4 is a flow chart showing one example of a process flow that may be executed by the distributed computing system when the system controller fails to receive a heartbeat message from the node controller.

FIG. 4 is a flow chart showing one example of a process flow 300 that may be executed by the distributed computing system 10 when the system controller 4 fails to receive a heartbeat message from the node controller 8. Like the process flow 200, the process flow 300 includes three columns. A column 301 includes actions that may be performed by the system controller 4. Column 303 includes actions that may be performed by the node controller 8, or any other node controller in the distributed computing system. Column 305 includes actions that may be performed by the shared resource provider 12, or any other shared resource provider associated with the node controller.

At 302, the system controller 4 may determine that an expected heartbeat message has not been received. For example, the system controller 4 may proceed to 302 as the failed heartbeat message contingency 226 described above. Because it has not received a heartbeat message, the system controller 4 may determine that the computing node 2a can no longer communicate with the computing node 2a, for example, because the computing node 2a has crashed or otherwise become inoperable, because the computing node 2a has lost network communications, because the computing node 2a has lost network communications, because the computing node 2a has lost power, because the computing node 2a has been turned-off, etc. Accordingly, at 304, the system controller 4 may send to the node controller 8 a computing job release instruction 307. The computing job release instruction 307 may instruct the node controller 8 to cease executing any computing jobs that it is currently executing.

The node controller 8 may receive the computing job release command 307 at 306. At 308, the node controller 8 may send a job stop command 309 to the shared resource provider 12. Optionally, at 310, the node controller 8 may also send job stop commands to one or more computing job processes 10a, 10b, 10c executing the computing job referenced by the computing job release command 307.

At 312, the shared resource provider 12 may receive the job stop command 309. At 314, the shared resource provider 12 may dismount the shared resources 6a, 6b. The shared resource provider 12 may dismount the resources 6a, 6b. Dismounting the shared resources may comprise any suitable manner of preventing the computing job processes 10a, 10b, 10c from accessing the shared resources. For example, when the shared resource provider 12 is a container, dismounting the shared resources 6a, 6b may comprise deleting the filesystem or volume name that was initially used to mount the resources. When the shared resource provider 12 is a process, dismounting the shared resources 6a, 6b may include simply ceasing to respond to requests from the computing job processes 10a, 10b, 10c for access to the shared resources 6a, 6b. When the shared resource provider 12 has dismounted the shared resources 6a, 6b, the computing job processes 10a, 10b, 10c may no longer have access to the shared resources 6a, 6b. Accordingly, the system controller 4 may assign the in-progress computing job or jobs to other computing nodes 2b, 2c, 2n with a lessened risk of collision or data corruption.

Although in the example of FIG. 4, the job release command 307 is sent when the system controller 4 has failed to receive an expected heartbeat message, there are other examples when the system controller 4 may send a job release command 307. For example, the system controller 4 may move one or more computing jobs from the computing node 2a to another computing node (e.g., 2b, 2c, 2n) in order to allow maintenance to the computing device executing the computing node 2a and/or for other reasons. In examples where a job release 307 is sent for a reason other than a missed heartbeat message, the system controller 4, node controller 8, and shared resource provider 12 may operate as described in FIG. 4 from action 304 forward.

As described above, in some examples, the system controller 4 may fail to receive an expected heartbeat message because the computing node 2a (and node controller 8) have either failed or because network communication between the system controller 4 and the node controller 8 has been lost. In these cases, the release instruction 307 may not immediately reach the node controller 8. If the computing node 2a has crashed, however, it may not continue executing the computing job or jobs assigned to it. If communication between the system controller and the computing node 2a has been lost, then the node controller 8 may fail to receive a heartbeat acknowledgement message and may therefore execute its own failed acknowledgement contingency, as described in FIG. 5.

Figure 5:
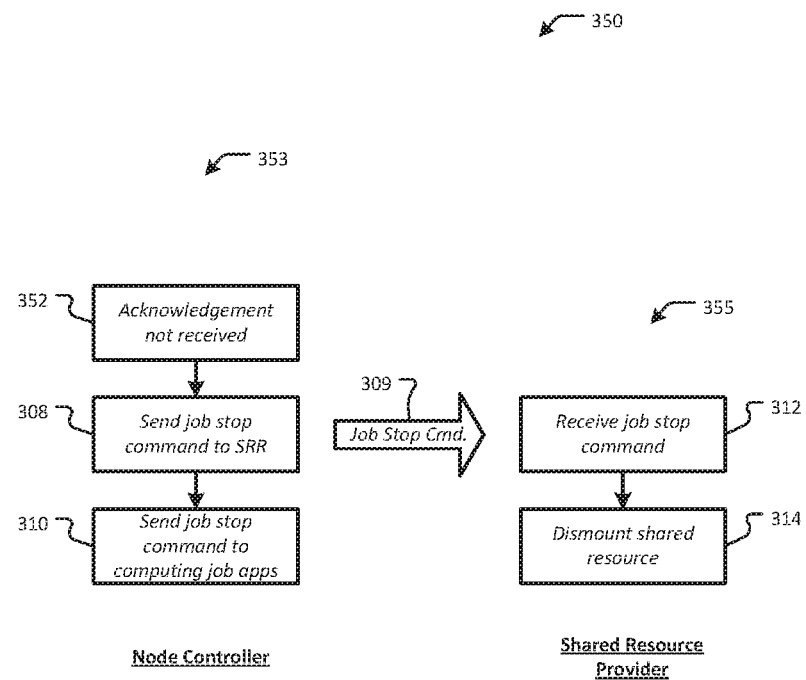
FIG. 5 is a flow chart showing one example of a process flow that may be executed by the distributed computing system when the node controller fails to receive an acknowledgement message from the system controller.

FIG. 5 is a flow chart showing one example of a process flow 350 that may be executed by the distributed computing system 10 when the node controller 8 fails to receive an acknowledgement message from the system controller 4. The process flow 350 includes three columns. Column 353 includes actions that may be performed by the node controller 8, or any other node controller in the distributed computing system. Column 355 includes actions that may be performed by the shared resource provider 12, or any other shared resource provider associated with the node controller.

At 352, the node controller 8 may determine that an expected acknowledgement message from the system controller 4 has not been received. At 308, the node controller 8 may send a job stop command 309 to the shared resource provider 12. Optionally, at 310, the node controller 8 may also send job stop commands to one or more computing job processes 10a, 10b, 10c executing the computing job referenced by the computing job release command 307. At 312, the shared resource provider 12 may receive the job stop command 309. At 314, the shared resource provider 12 may dismount the shared resources 6a, 6b, for example, as described above.

As described above, in examples where communication is lost between the system controller 4 and the node controller 8, the job release instruction 307 of FIG. 4 may not reach the node controller 8. When this occurs, in some examples, acknowledgement messages from the system controller 4 may also fail to reach the node controller 8. Accordingly, in some examples, the system controller 4 may execute its actions in the process flow 300 while, at the same time or shortly thereafter, the node controller 8 and shared resource provider 12 may execute their actions from the process flow 350.

Although in the example of FIG. 4, the job stop command 309 is sent in response to a job release command 307 from the system controller 4, and in the example of FIG. 5, the job stop command 309 is sent after the failure to receive an acknowledgement message, the node controller 8 may send the job stop command 309 in other circumstances. In some examples, the shared resource provider 12 may be instructed to dismount one or more shared resources 6a, 6b while a computing job is in-progress (e.g., after the computing job has been started but before it has been completed). This may create a risk that one or more of the shared resources 6a, 6b is in an inconsistent state when the shared resource provider 12 dismounts.

In some examples, one or more of the shared resources 6a, 6b may be a file system or other data storage device or data storage management system that maintains a journal of reads and writes independent of the computing node 2a. Accordingly, when the shared resource provider 12 dismounts such a shared resource 6a, 6b, the shared resource 6a, 6b may be configured to roll back reads and writes received from the computing job processes 10a, 10b, 10c via the shared resource provider 12. In some examples, the shared resource 6a, 6b rolls back all reads and writes since the shared resource provider 12 mounted the shared resource. In some examples, the shared resource 6a, 6b rolls back reads and writes since a predetermined time or a predetermined event.

In some examples, the computing job processes 10a, 10b, 10c may be programmed to perform operations on the shared resources in time with the heartbeat interval. Accordingly, the node controller 8 and/or system controller 4 may be aware of the state of the shared resources at the time of each heartbeat message. In some examples, the node controller 8 may include in a heartbeat message, data describing the state of the shared resources 6a, 6b at the time of the heartbeat message. In some examples, the node controller 8 may receive an indication of the state of the shared resources 6a, 6b from the shared resource provider 12 and/or one or more computing job processes 10a, 10b, 10c prior to sending a heartbeat message. When the system controller 4 migrates the computing job, it may instruct the next computing node 2b, 2c, 2n that is to perform the computing job to begin at the point where the prior computing node 2a left off.

Reference in the specification to, "examples," "various examples," "some examples," etc. means that a particular feature, structure, or characteristic described in connection with the example embodiments is included in at least one embodiment of the invention. The appearances of the above-referenced phrases in various places in the specification are not necessarily all referring to the same embodiment. Reference to embodiments is intended to disclose examples, rather than limit the claimed invention. While the invention has been particularly shown and described with reference to several embodiments, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the present disclosure is intended to be illustrative, but not limiting, of the scope of the invention.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

In some examples of the present methods and systems disclosed herein, a single component can be replaced by multiple components, and multiple components replaced by a single component, to perform a given command or commands. Except where such substitution would not be operative to practice the present methods and systems, such substitution is within the scope of the present disclosure. Examples presented herein, including operational examples, are intended to illustrate potential implementations of the present method and system examples. Such examples are intended primarily for purposes of illustration. No particular aspect or aspects of the example method, product, computer-readable media, and/or system examples described herein are intended to limit the scope of the present disclosure.

The various components described herein may be and/or are executed by any suitable type of computing device including, for example, desktop computers, laptop computers, mobile phones, palmtop computers, personal data assistants (PDAs), etc. As used herein, a "computer," "computer system," "computing device," or "computing device," "machine," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing, and/or communicating data. Such memory can be internal, external, remote, or local with respect to its operatively associated computer or computer system. Memory may also include any means for storing software or other instructions including, for example and without limitation, a hard disk, an optical disk, floppy disk, ROM (read-only memory), RAM (random-access memory), PROM (programmable ROM), EEPROM (extended erasable PROM), and/or other like computer-readable media.

Some portions of the above disclosure are presented in terms of methods and symbolic representations of operations on data bits within a computer memory. These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the preceding discussion, throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of a method. It should be noted that the process steps and instructions of the present disclosure can be embodied in software, firmware, or hardware, and when embodied in software, can be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random-access memories (RAMs), electrically-programmable read-only memories (EPROMs), electrically erasable programmable read-only memories (EEPROMs), magnetic or optical cards, application-specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and systems presented herein, unless indicated otherwise, are not inherently related to any particular computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, although some of the examples herein are presented in the context of a particular programming language, the present disclosure is not limited to any particular programming language. A variety of programming languages may be used to implement the teachings of the present disclosure as described herein, and any references above to specific languages are provided for disclosure of enablement and best mode of the present disclosure.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

What is claimed is:

1. A method for executing a computing job in a computing node of a distributed computing system, comprising:
    executing a node controller;
    receiving, by the node controller, computing job request data from a cloud controller, the computing job request data describing a computing job for execution by the computing node;
    executing a shared resource provider container;
    sending, by the node controller and to the shared resource provider container, job start data indicating a shared network file system (NFS) external to the computing node to be accessed during performance of the computing job;
    executing a computing job process inside the shared resource provider container;
    creating, by the shared resource provider container, a private file system that references the shared NFS in a private namespace of the shared resource provider container;
    providing, by the shared resource provider container, a name referencing the private file system to the computing job process;
    sending, by the node controller, a heartbeat message to the cloud controller;
    receiving, by the node controller and from the cloud controller, an acknowledgement message referencing the heartbeat message;
    receiving, by the node controller and from the cloud controller, a job release instruction referencing the computing job;
    sending, by the node controller and to the shared resource provider container, a job stop command; and
    in response to the job stop command, deleting the private file system, by the shared resource provider container.

2. The method of claim 1, further comprising:
    sending, by the node controller, a second heartbeat message to the cloud controller; and
    determining, by the node controller, that a second acknowledgement message referencing the second heartbeat message has not been received.

3. The method of claim 1, wherein the job start data comprises a name of the shared NFS.

4. The method of claim 1, further comprising sending, by the node controller, a second heartbeat message to the cloud controller, wherein the heartbeat message is sent at a first time and the second heartbeat message is sent at a second time that is a heartbeat interval after the sending of the heartbeat message.

5. A system for executing a computing job at a computing node of a distributed computing system, comprising:
    at least one processor; and
    a data storage device in communication with the at least one processor, wherein the data storage device comprises instructions that, when executed by the at least one processor, causes the at least one processor to:
    execute a node controller;
    receive, by the node controller, computing job request data from a system controller, the computing job request data describing a computing job for execution by the computing node;
    execute a shared resource provider;
    send, by the node controller and to the shared resource provider, job start data indicating at least one shared resource for the computing job;
    execute a computing job process;
    mount the shared resource, by the shared resource provider;
    receive, by the shared resource provider and from the computing job process, a request to access the shared resource;

send, by the node controller, a heartbeat message to the system controller;

receive, by the node controller, an acknowledgement message referencing the heartbeat message;

send, by the node controller and to the shared resource provider, a job stop command; and in response to the job stop command, dismount the shared resource, by the shared resource provider.

6. The system of claim 5, wherein the data storage device further comprises instructions that, when executed by the at least one processor, causes the at least one processor to send, by the node controller, a second heartbeat message to the system controller, wherein the heartbeat message is sent at a first time and the second heartbeat message is sent at a second time that is a heartbeat interval after the send of the heartbeat message.

7. The system of claim 6, wherein the computing job request data comprises an indication of the heartbeat interval.

8. The system of claim 5, wherein the data storage device further comprises instructions that, when executed by the at least one processor, causes the at least one processor to, before sending the job stop command, receive, by the node controller and from the system controller, a job release command.

9. The system of claim 5, wherein the data storage device further comprises instructions that, when executed by the at least one processor, causes the at least one processor to identify, by the shared resource provider, the shared resource based at least in part on the job start data.

10. The system of claim 5, wherein the data storage device further comprises instructions that, when executed by the at least one processor, causes the at least one processor to:

execute an operating system; and execute a container engine in communication with the operating system, wherein the shared resource provider comprises a container configured to access the shared resource through the container engine, and wherein the computing job process is executed in the container.

11. The system of claim 5, wherein the shared resource provider comprises a hypervisor and wherein the computing job process comprises a virtual machine in communication with the hypervisor.

12. The system of claim 5, wherein the data storage device further comprises instructions that, when executed by the at least one processor, causes the at least one processor to create, by the shared resource provider, a private file system that references the shared resource in a private namespace of the shared resource provider.

13. The system of claim 5, wherein the data storage device further comprises instructions that, when executed by the at least one processor, causes the at least one processor to execute a virtual machine, wherein the node controller, the shared resource provider and the computing job process execute in the virtual machine.

14. A method for executing a computing job at a computing node of a distributed computing system, comprising:

executing a node controller;

receiving, by the node controller, computing job request data from a system controller, the computing job request data describing a computing job for execution by the computing node;

executing a shared resource provider;

sending, by the node controller and to the shared resource provider, job start data indicating at least one shared resource for the computing job;

executing a computing job process;

mounting the shared resource, by the shared resource provider;

receiving, by the shared resource provider and from the computing job process, a request to access the shared resource;

sending, by the node controller, a heartbeat message to the system controller;

receiving, by the node controller, an acknowledgement message referencing the heartbeat message;

sending, by the node controller and to the shared resource provider, a job stop command; and in response to the job stop command, dismounting the shared resource, by the shared resource provider.

15. The method of claim 14, further comprising:

sending, by the node controller, a second heartbeat message to the system controller; and before sending the job stop command, determining, by the node controller, that it has not received a second acknowledgement message referencing the second heartbeat message.

16. The method of claim 14, further comprising, before sending the job stop command, receive, by the node controller and from the system controller, a job release command.

17. The method of claim 14, further comprising:

executing an operating system; and executing a container engine in communication with the operating system, wherein the shared resource provider comprises a container configured to access the shared resource through the container engine, and wherein the computing job process is executed in the container.

18. The method of claim 14, further comprising identifying, by the shared resource provider, the shared resource based at least in part on the job start data.

19. The method of claim 14, further comprising identifying, by the shared resource provider, the shared resource based at least in part on the job start data.

20. The method of claim 14, further comprising executing a virtual machine, wherein the node controller, the shared resource provider and the computing job process execute in the virtual machine.

* * * * *